United States Patent [19]
Cullen

[11] Patent Number: 5,799,472
[45] Date of Patent: Sep. 1, 1998

[54] BAG PAN FOR AN AGRICULTURAL FEED BAGGING MACHINE

[75] Inventor: Steven R. Cullen, Astoria, Oreg.

[73] Assignee: Versa Corp., Astoria, Oreg.

[21] Appl. No.: 874,308

[22] Filed: Jun. 13, 1997

[51] Int. Cl.⁶ .................................................. B65B 63/02
[52] U.S. Cl. ........................... 53/567; 53/527; 100/100
[58] Field of Search ............................ 53/567, 576, 527,
53/530, 118; 141/10, 313, 314, 114; 100/100

[56] References Cited

U.S. PATENT DOCUMENTS

| | | | |
|---|---|---|---|
| 3,687,064 | 8/1972 | Glanz | 100/100 |
| 3,791,593 | 2/1974 | Griffin | 239/667 |
| 4,046,068 | 9/1977 | Eggenmüller et al. | 100/65 |
| 4,308,901 | 1/1982 | Lee | 141/114 |
| 4,310,036 | 1/1982 | Rasmussen et al. | 141/114 |
| 4,337,805 | 7/1982 | Johnson et al. | 141/71 |
| 4,502,378 | 3/1985 | Cullen | 100/65 |
| 4,610,123 | 9/1986 | Krone et al. | 53/118 |
| 4,621,666 | 11/1986 | Ryan | 141/114 |
| 4,653,553 | 3/1987 | Cox et al. | 141/114 |
| 4,688,480 | 8/1987 | Ryan | 100/144 |
| 4,724,876 | 2/1988 | Ryan | 141/114 |
| 4,945,715 | 8/1990 | Brodrecht | 53/567 |
| 4,949,633 | 8/1990 | Johnson et al. | 100/65 |
| 5,159,877 | 11/1992 | Inman et al. | 100/144 |
| 5,220,772 | 6/1993 | Koskela et al. | 53/576 |
| 5,269,829 | 12/1993 | Meyer | 71/9 |
| 5,295,554 | 3/1994 | Cullen | 180/236 |
| 5,297,377 | 3/1994 | Cullen | 53/527 |
| 5,408,809 | 4/1995 | Cullen | 53/567 |

*Primary Examiner*—James F. Coan
*Assistant Examiner*—Gene L. Kim
*Attorney, Agent, or Firm*—Zarley, McKee, Thomte, Voorhees & Sease; Dennis L. Thomte

[57] ABSTRACT

A bag pan is provided for an agricultural feed bagging machine wherein the bag pan is supported by a pair of bag pan support arms which are vertically movably mounted in guide track support housings having guide tracks therein. The upper ends of the bag pan support arms have rollers thereon which engage track members in the guide track housings. The upper ends of the support arms are individually connected to a hydraulic cylinder by means of a flexible cable. The individual connection of the bag pan support arms with the hydraulic cylinder enables the bag pan on the support arms to conform to uneven ground conditions beneath the bag pan.

10 Claims, 4 Drawing Sheets

5,799,472

BAG PAN FOR AN AGRICULTURAL FEED BAGGING MACHINE

BACKGROUND OF THE INVENTION

1. Field of the Invention

This invention relates to an agricultural feed bagging machine and more particularly to a bag pan for an agricultural feed bagging machine.

2. Background Information

Agricultural feed bagging machines have been employed for several years to pack or bag silage or the like into elongated plastic bags. Two of the earliest bagging machines are disclosed in U.S. Pat. Nos. 3,687,061 and 4,046,068. In the prior art bagging machines, silage or the like is supplied to the forward or intake end of the bagging machine and is fed to a rotor or the like which conveys the silage into a tunnel on which the bag is positioned so that the bag is filled. As the silage is loaded into the bag, the bagging machine moves away from the filled end of the bag in a controlled fashion so as to achieve uniform compaction of the silage material within the bag.

The empty elongated plastic bags are in a folded condition and are initially positioned over the rearward end of the tunnel of the machine. The conventional tunnels have a curved top wall, downwardly extending side walls and a floor located at the lower forward end thereof. Normally, the tunnel has a bag pan positioned below the floor which supports the lower end of the folded bag to keep the folded bag from dragging on the ground beneath the bagging machine. Normally, the conventional bag pans are pivotally secured at their forward ends to the machine and are raised and lowered by means of chains connected to the opposite ends of the rearward end of the bag pan. The prior art chain supports for the bag pans normally require that each side of the bag pan be individually raised so that the proper chain link may be secured so that there will be sufficient clearance between the bag pan and the tunnel floor bottom to enable the bag to slide and pass from the tunnel without ripping while yet preventing the entire bag from pulling from the tunnel at one time.

Applicant solved many of the problems of the prior art by way of the bag pan support disclosed in U.S. Pat. No. 5,408,809. Although the bag pan support in U.S. Pat. No. 5,408,809 solved many of the problems of the prior art, the advent of extremely large machines utilizing bag diameters of up to 12 feet and weighing up to 1,200 pounds has created a problem in that it is difficult to push the bag up the slant of the typical hinged down/up bag pan such as used in the prior art and such as illustrated in U.S. Pat. No. 5,408,809. Further, the hinged bag pans of the prior art sometimes did not rest evenly on the ground when one end of the bag pan was resting on a high spot thereunder.

SUMMARY OF THE INVENTION

An improved bag pan is provided for an agricultural feed bagging machine with the bag pan assembly comprising a pair of horizontally spaced-apart bag pan arms which are vertically movably mounted in an angled guide track. The bag pan is positioned on the bag pan arms and extends therebetween. A hydraulic cylinder is mounted on the bagging machine and has a pair of cables connected to the cylinder rod thereof. One cable is operatively connected to one of the bag pan arms while the other cable is operatively connected to the other bag pan arm. Retraction of the cylinder rod into the hydraulic cylinder causes the cables to raise the bag pan arms and the bag pan having the folded bag thereon. Extension of the cylinder rod from the hydraulic cylinder causes the bag pan arms and bag pan to be lowered downwardly into ground engaging position. Since the cables are individually connected to the bag pan arms, if the pan is lowered onto uneven ground, one side of the bag pan can remain up at rest while the other side rests on the lower ground, thereby making the bag much easier to install with less labor.

It is therefore a principal object of the invention to provide an improved bag pan for an agricultural feed bagging machine.

Still another object of the invention is to provide a bag pan for an agricultural feed bagging machine wherein the bag pan is raised and lowered by means of a hydraulic cylinder operatively connected thereto by means of a pair of cables.

Yet another object of the invention is to provide a bag pan for an agricultural feed bagging machine wherein the bag pan, when lowered, can conform to uneven ground surfaces due to the connection of the bag pan with the hydraulic cylinder.

Yet another object of the invention is to provide a bag pan for an agricultural feed bagging machine which enables extremely large and heavy bags to be supported thereby.

Yet another object of the invention is to provide a bag pan for an agricultural feed bagging machine which is substantially horizontally disposed when in its upper bag supporting position and which is rearwardly inclined when in its lower bag loading position.

Yet another object of the invention is to provide a bag pan for an agricultural feed bagging machine including means for locking the bag pan in its upper bag supporting position.

These and other objects will be apparent to those skilled in the art.

DESCRIPTION OF THE PREFERRED EMBODIMENT

Figure 1:
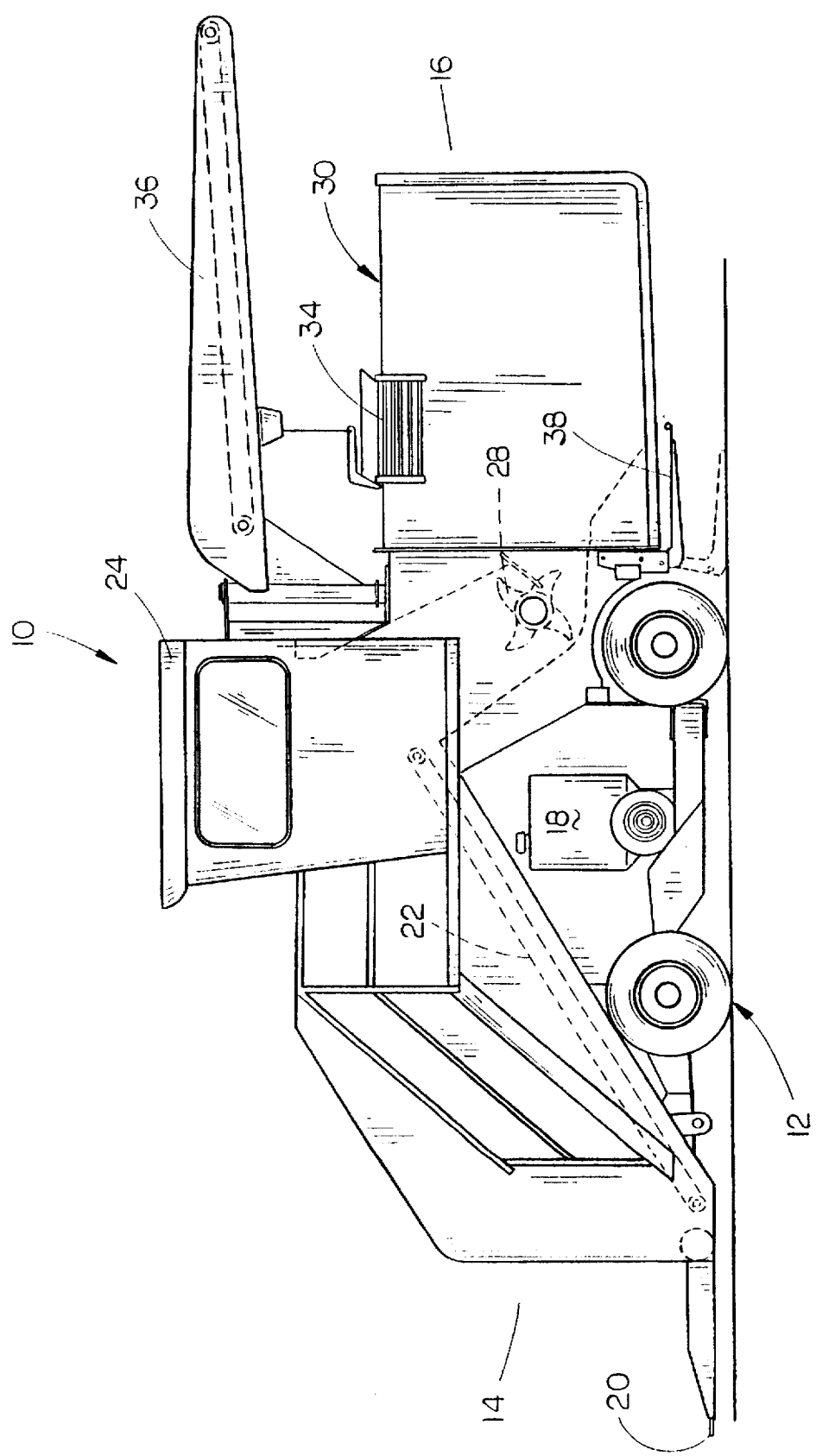
FIG. 1 is a side elevational view of an agricultural feed bagging machine having the bag pan of this invention mounted thereon.

The numeral 10 refers to an agricultural feed bagging machine such as the Versa Bagger Model ID1012 manufactured by Versa Corporation, Astoria, Oreg. The bagging machine illustrated in the drawings is extremely large and the bag pan of this invention is ideally suited for use thereon. However, the bag pan of this invention may also be utilized on smaller machines such as the machine illustrated in U.S. Pat. No. 5,408,809.

For purposes of description, machine 10 includes a wheeled frame means 12 having a forward end 14 and a rearward end 16. Machine 10 includes an engine 18 which is used to power the various components thereon. Machine 10 includes a tow hitch 20 at the forward end thereof as well as a feed table 22. Machine 10 also includes an operator's cab 24 positioned above and rearwardly of the feed table 22.

Feed table 22 includes an upwardly inclined conveyor which is designed to deliver the feed to a rotor 28 which is adapted to force the feed being bagged into the intake end of a tunnel 30. Tunnel 30 includes a rail bottom 32 and has a bag cradle 34 removably mounted at the upper end thereof. Bag crane 36 is provided on the machine 10 for raising and lowering the cradle 34 as well as moving the cradle 34 rearwardly and forwardly.

The bag pan assembly of this invention is referred to generally by the reference numeral 38 and includes a vertically disposed hydraulic cylinder 40 conveniently mounted on the machine 10 and which has a cylinder rod 42 extending therefrom. Right-hand cable 44 is connected to the end of rod 42, as illustrated in the drawings, as is left-hand cable 46. Right-hand cable 44 extends downwardly towards thrust tube assembly 48. Left-hand cable 46 extends around pulley 50 and is connected to a turn buckle 52 which is used for adjusting the length of cable 46. Cable 46 extends over pulley 54 and extends towards thrust tube assembly 56. Inasmuch as thrust tube assemblies 48 and 56 are identical, only thrust tube assembly 56 will be described in detail. Thrust tube assembly 56 includes a pair of vertically disposed and horizontally spaced-apart upper guide tracks 58 and 60 and lower guide tracks 62 and 64 which extend forwardly and downwardly from the lower ends of guide tracks 58 and 60.

The numerals 66 and 68 refer to generally L-shaped bag pan arms. Inasmuch as bag pan arms 66 and 68 are identical, only bag pan arm 68 will be described in detail. Bag pan support 68 includes a substantially horizontally disposed arm portion 70 and a substantially vertically disposed arm portion 72. Shafts 74, 76 and 78 are mounted on the arm portion 68 and have rollers 80, 80' and 80" mounted on the opposite ends thereof, respectively, which are adapted to engage the guide tracks as will be described in more detail hereinafter. Bag pan 82 is mounted on and supported by the bag pan arms 66 and 68, as illustrated in the drawings. The lower ends of cables 44 and 46 are connected to the upper ends of bag pan arms 66 and 68, respectively.

Figure 2:
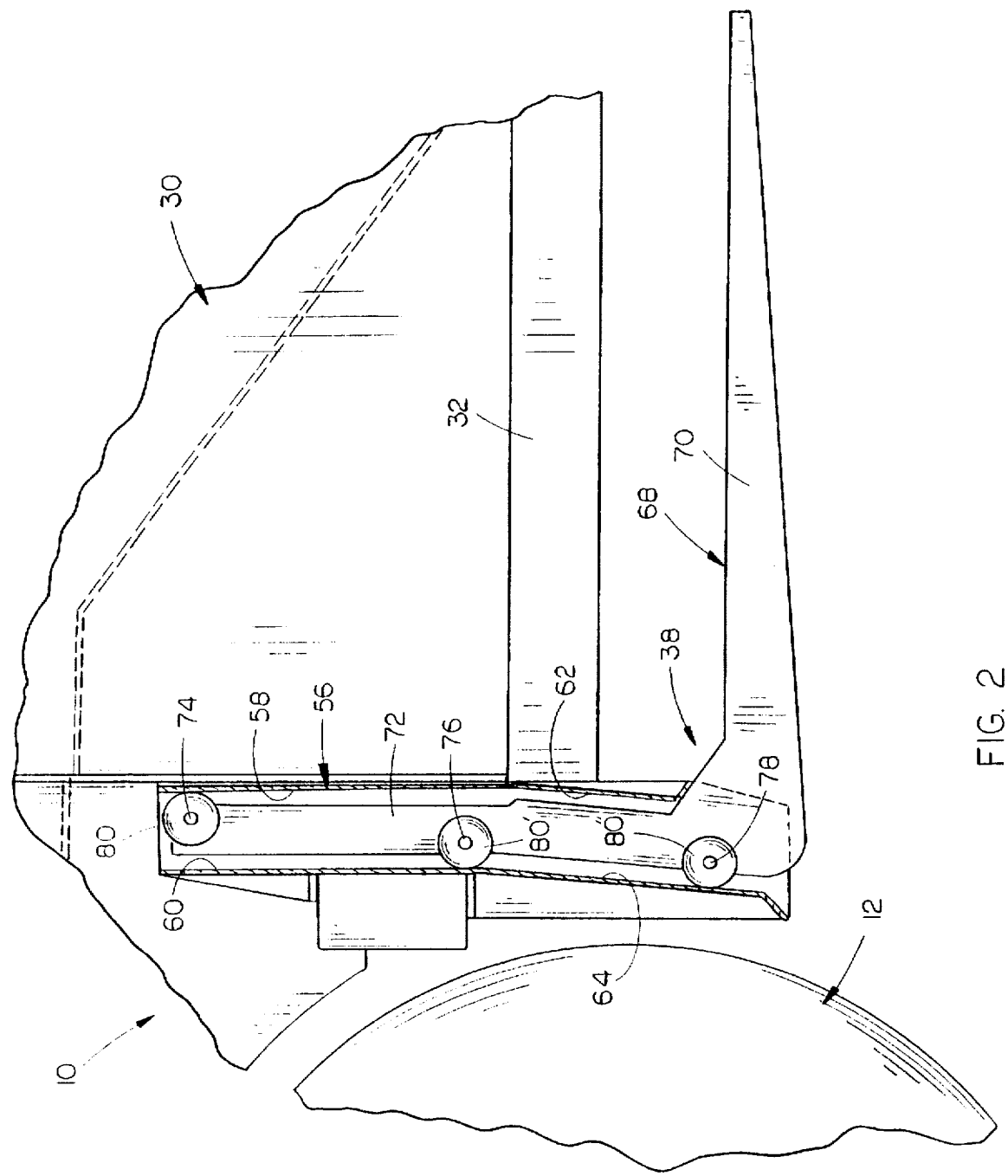
FIG. 2 is a partial vertical sectional view of the bag pan of this invention.
Figure 4:
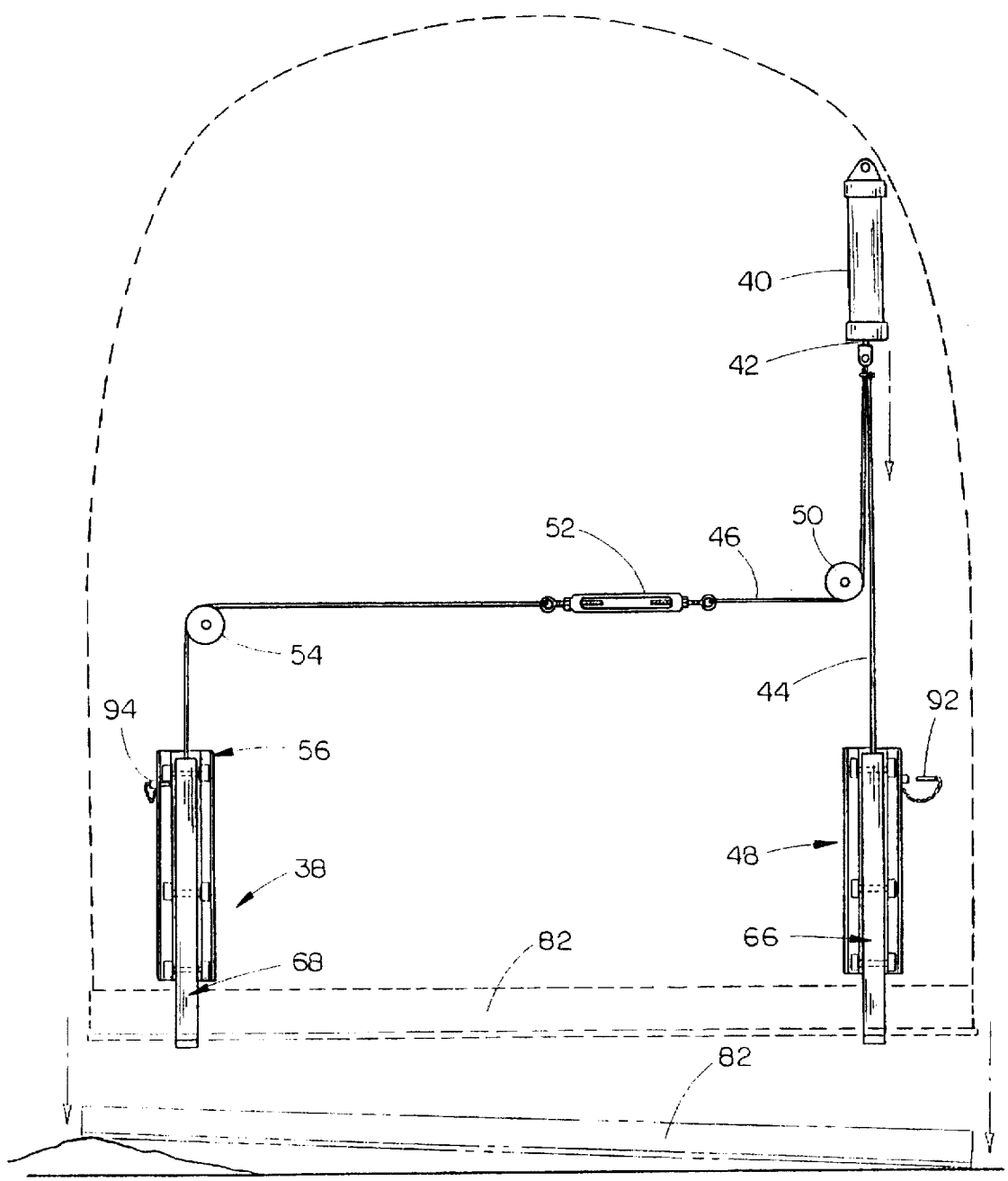
FIG. 4 is a rear schematic view of the bag pan of this invention.

When the hydraulic cylinder 40 is in its retracted position, the rollers 80, 80' and 80" on the shafts 74, 76 and 78 on both of the bag pan arms 66 and 68 will be positioned in the thrust tube assemblies 48 and 56, as illustrated in FIGS. 2 and 4. When the bag pan assembly 38 is in its uppermost or bag supporting position, the rollers 80 on the shaft 74 will be in engagement with upper guide track 58 at the upper end thereof, as illustrated in FIG. 2. In the uppermost position, the rollers 80' on shaft 76 will be in engagement with the lower end of upper guide track 60, as illustrated in FIG. 2. In the upper position, the rollers 80" on shaft 78 will be in engagement with the lower end of lower guide track 64, as seen in FIG. 2. The weight of the bag pan, as well as the weight of the bag thereon, will tend to keep the rollers in the position just described. In the upper position, the bag pan 82 is substantially horizontally disposed and will maintain the lower end of the folded bag thereon. When the bag pan is in its raised position, pins 92 and 94 may be inserted into suitable openings formed in thrust tube assemblies 48 and 56, respectively, below the uppermost rollers 80, to lock the bag pan 82 in its uppermost bag supporting position.

Figure 3:
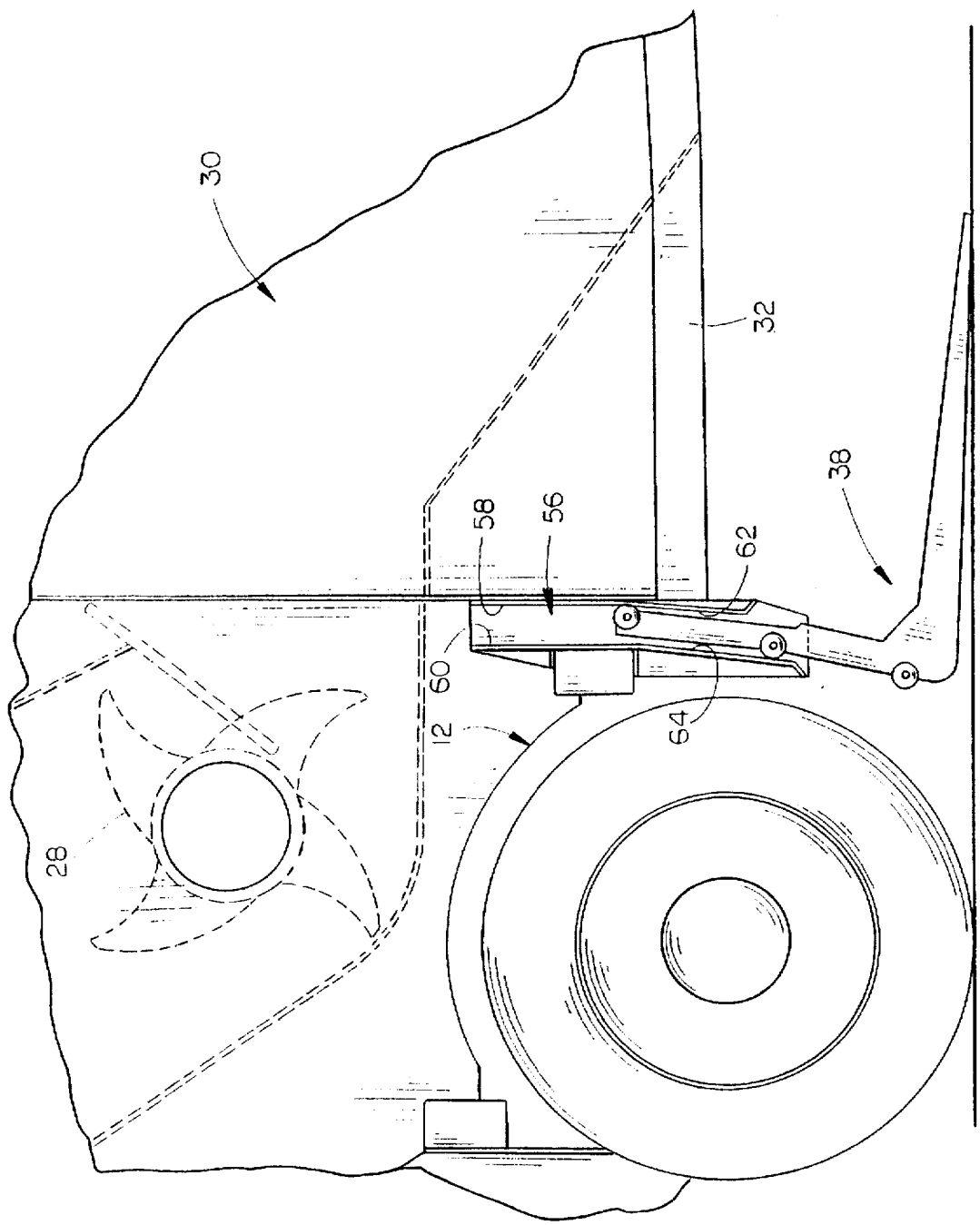
FIG. 3 is a partial side elevational view of the bag pan having portions thereof cut away to more fully illustrate the invention.

When it is desired to lower the bag pan 82 to place a new bag thereon, hydraulic cylinder 40 is extended which causes the cables 44 and 46 to lower the bag pan arms 66 and 68, thereby lowering the bag pan 82 therewith. The angled relationship of the guide tracks in the thrust tube assemblies causes the bag pan arms and the bag pan 82 to assume a slightly downwardly inclined position, as illustrated in FIG. 3, to enable the lower end of the folded bag to be moved upwardly thereon in a more convenient fashion. The relationship of the rollers on the shafts 74, 76 and 78 permit the bag pan to assume the position illustrated in FIG. 3. If the ground is level beneath the bag pan 82, each of the cables 44 and 46 will be lowered the same amount. If there is an uneven ground condition below one end of the bag pan, such as illustrated by broken lines in FIG. 4, the left end of the bag pan will rest thereon while the right end of bag pan 82 will be lowered to the ground, thereby allowing the bag pan to be tilted to ensure that the front lip of the bag pan will lay flat most of the time. Due to the individual flexible connection of the bag pan arms 66 and 68 with the hydraulic cylinder rod, the bag pan will be in a better position to receive the bag thereon. The conformance of the bag pan to the ground is made possible due to the fact that the arms 66 and 68 are not rigidly connected together, but are only connected to the hydraulic cylinder rod by means of the flexible cables.

Thus it can be seen that an improved bag pan has been described for an agricultural bagging machine which accomplishes at least all of its stated objectives.

I claim:

1. An agricultural feed bagging machine for bagging agricultural feed material into agricultural bags having a closed end and an open mouth comprising:

a wheeled frame having rearward and forward ends;

a tunnel on said wheeled frame having an intake end for receiving the material to be bagged and an output end adapted to receive the open mouth of the agricultural bag;

said tunnel having a top wall, opposite side walls and a floor;

material receiving means on said wheeled frame forwardly of said tunnel for receiving the material to be bagged;

means at the intake end of said tunnel for forcing the material to be bagged from said material receiving means into said tunnel and into said bag;

a bag pan means positioned beneath said tunnel for supporting the lower portion of a folded bag positioned on said tunnel;

said bag pan means having rearward and forward ends and opposite sides;

said bag pan means being selectively vertically movable between an upper bag supporting position and a lower bag loading position;

and means operatively connected to said bag pan means for vertically moving said bag pan means between its said bag loading and bag supporting positions said means operatively connected to said bag pan means for vertically moving said bag pan means including a first flexible cable operatively connected to one side of said bag pan means a second flexible cable operatively connected to the other side of said bag pan means and a power cylinder operatively connected to said first and second cables.

2. The feed bagging machine of claim 1 wherein said means operatively connected to said bag pan means for vertically moving said bag pan means includes a first flexible cable operatively connected to one side of said bag pan means, a second flexible cable operatively connected to the other side of said bag pan means, and a power cylinder operatively connected to said first and second cables.

3. The feed bagging machine of claim 1 wherein at least one of said first and second cables is length adjustable.

4. The feed bagging machine of claim 1 wherein said bag pan means includes first and second horizontally spaced-apart bag pan arms; each of said bag pan arms being generally L-shaped and having an upstanding portion and a generally horizontally disposed portion extending rearwardly from the lower end of said upstanding portion; said bag pan means including a bag pan positioned on said horizontally disposed portions of said bag pan arms and extending therebetween; said wheeled frame means having first and second upstanding guides mounted thereon which are horizontally spaced-apart from one another; said upstanding portions of said first and second bag pan arms being vertically movably mounted on said first and second guides, respectively; said first cable being operatively secured to said upstanding portion of said first bag pan arm; said second cable being operatively secured to said upstanding portion of said second bag pan arm.

5. The feed bagging machine of claim 4 wherein each of said guides comprises a hollow tube means having a guide track therein and wherein each of said upstanding portions of said bag pan arms has a plurality of vertically spaced-apart guide rollers mounted thereon which engage said guide track in the respective hollow tube means.

6. The feed bagging machine of claim 4 wherein said bag pan is substantially horizontally disposed when said bag pan means is in its said upper bag supporting position and wherein said bag pan is rearwardly inclined, with respect to the horizontal, when in its said lower bag loading position.

7. The feed bagging machine of claim 1 wherein means is provided for locking said bag pan means in its said upper bag supporting position.

8. The feed bagging machine of claim 4 wherein means is provided for locking said bag pan means in its said upper bag supporting position.

9. The feed bagging machine of claim 5 wherein each of said guide tracks has an upper portion and a lower portion, said upper portion being substantially vertically disposed, said lower portion extending forwardly and downwardly from said upper portion to cause said bag pan to be substantially horizontally disposed when said bag pan means is in its said upper bag supporting position and to cause said bag pan to be rearwardly inclined, with respect to the horizontal, when in its said lower bag loading position.

10. An agricultural feed bagging machine for bagging agricultural feed material into agricultural bags having a closed end and an open mouth comprising:

a wheeled frame having rearward and forward ends;

a tunnel on said wheeled frame having an intake end for receiving the material to be bagged and an output end adapted to receive the open mouth of the agricultural bag;

said tunnel having a top wall, opposite side walls and a floor;

material receiving means on said wheeled frame forwardly of said tunnel for receiving the material to be bagged;

means at the intake end of said tunnel for forcing the material to be bagged from said material receiving means into said tunnel and into said bag;

a bag pan means positioned beneath said tunnel for supporting the lower portion of a folded bag positioned on said tunnel;

said bag pan means having rearward and forward ends and opposite sides;

said bag pan means being selectively vertically movable between an upper bag supporting position and a lower bag loading position;

and means operatively connected to said bag pan means for vertically moving said bag pan means between its said bag loading and bag supporting positions;

said means operatively connected to said bag pan means for vertically moving said bag pan means comprising a power cylinder means.

* * * * *